May 3, 1966     E. TOROSSIAN     3,249,180

LONGITUDINAL LOCKING DEVICE FOR CYLINDRICAL RODS OR SHAFTS

Filed Nov. 8, 1963     2 Sheets-Sheet 1

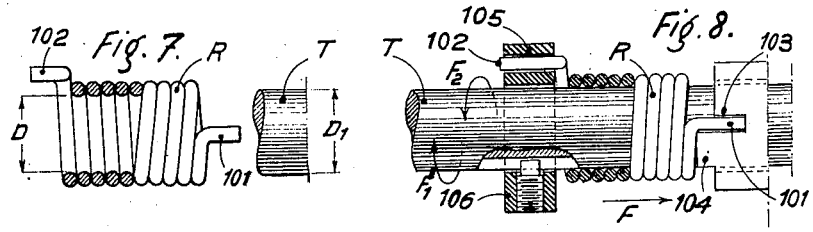
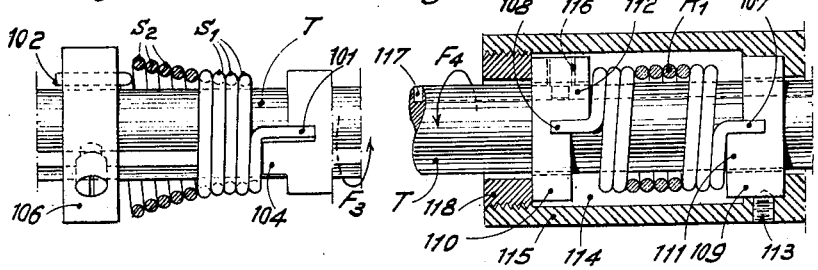

United States Patent Office 3,249,180
Patented May 3, 1966

3,249,180
LONGITUDINAL LOCKING DEVICE FOR
CYLINDRICAL RODS OR SHAFTS
Edouard Torossian, Bolleystr. 50, Zurich, Switzerland
Filed Nov. 8, 1963, Ser. No. 322,465
Claims priority, application Switzerland, Jan. 29, 1963,
1,094/63
7 Claims. (Cl. 188—67)

This invention relates to a longitudinal locking device for cylindrical rods or shafts.

Coil springs are frequently used as radial locking devices on cylindricl rods or shafts. In fact it is well known that in cases where a cylindrical rod extends with more or less adhesion through a coil spring, the rod can still be turned within the spring with more or less ease in the direction of pitch of the said spring, but that it is securely locked in the opposite direction.

It is also known that whatever the adhesion of a spring to a cylindrical rod, this adhesion is insufficient to cause secure longitudinal locking.

Accordingly the invention has as its object the provision of an arrangement whereby cylindrical rods or shafts can be locked longitudinally by means of coil springs, and is characterised in that the seat of the spring used is constituted by a segmental abutment acting on only part of the first turn and leaving free the greater part of the said turn, so as to force these turns to rock, under the action of any tractive force exerted on the rod, about the abutment and to permit thus increasing their adhesion in dependence on the tractive force.

Although this device is completely satisfactory in many cases where locking and unlocking operations are accidental, for example a safety installation for hoisting apparatus etc., in all cases which require frequent operations, such as for example the opening or closing of a vise, despite all precautions which may be taken and for reasons which will be explained hereinafter it is impossible to prevent permanent deformation of the spring, which renders the device unusable after a few operations.

In order to overcome this disadvantage, the internal diameter of the spring is preferably chosen to be slightly larger than that of the rod to be locked, so as to prevent permanent deformation of the spring.

Figure 1:
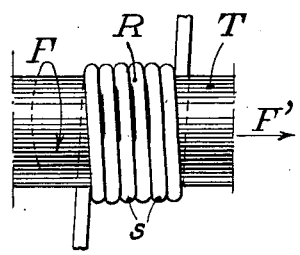
Figure 2:
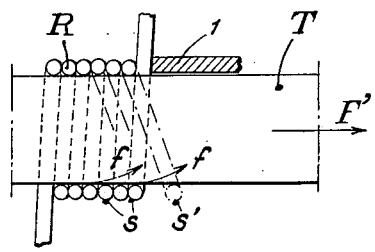
Figure 3:
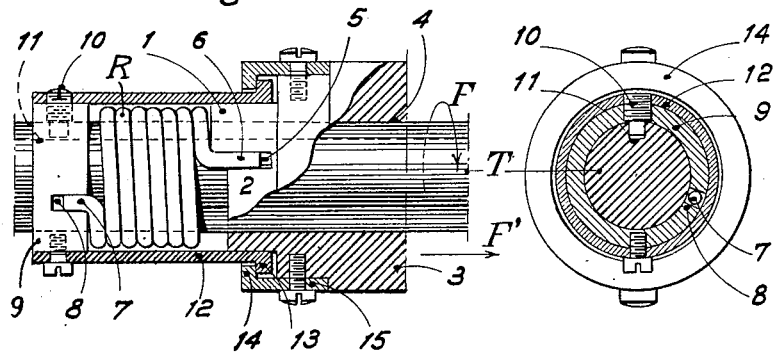
Figure 4:
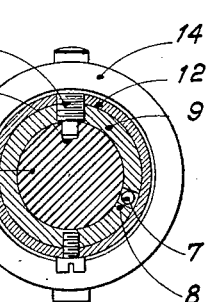
Figure 5:
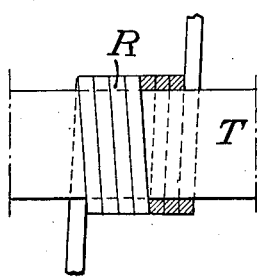
Figure 6:
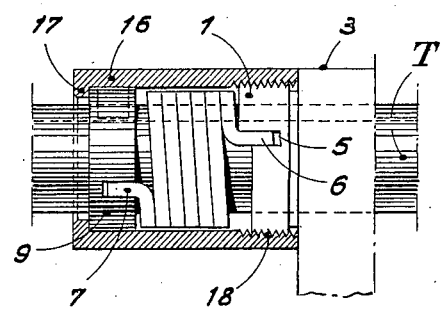

The invention will now be described by way of example with reference to the accompanying drawings wherein:

FIGURES 1 and 2 are explanatory diagrammatic views,

FIGURES 3 and 4 are views of a form of embodiment respectively in longitudinal section and in cross-section, FIGURES 5 and 6 show variants, FIGURES 7, 8 and 9 are explanatory diagrammatic views, FIGURE 10 is a view in longitudinal section of another way of mounting the spring, FIGURE 11 is a longitudinal sectional view showing the use of the device for locking and unlocking two sliding members, FIGURE 12 is a diagrammatic end view thereof, FIGURE 13 shows a variant of the foregoing device, and FIGURE 14 is an explanatory diagrammatic sectional view taken on the line X—X of FIGURE 13.

FIGURE 1 shows the conventional case of a rod T which with a given amount of adhesion extends through a spring R which has for example a right-hand pitch. It is known that this rod can be rotated towards the right more or less easily depending on the adhesion of the turns $s$, whereas it is securely locked in the direction of the arrow F.

On the contrary, whatever the adhesion of the turns $s$ on the rod T, this adhesion cannot in any way cause a secure locking effect in the longitudinal direction F′ since, this adhesion being constant, it is sufficient for the tractive force or pressure force acting on the rod to be greater for the said rod to slide within the spring.

The longitudinal locking of the rod T in the spring R is effected by increasing the adhesion of the turns $s$ in dependence on the tractive or compressive force to which this rod is subjected.

For this purpose, the spring R rests on a seat constituted by a segment 1 acting as an abutment only over an inconsiderable proportion of the annulus formed by the first turn, whereas the rest of the annulus is left entirely free (FIGURE 2).

As a result any displacement of the rod T initiated in the direction of the arrow F′ tends—by reason of their adhesion to this rod—to entrain the free portions of the turns $s$ and to rock them as indicated by the arrows $f$, using the abutment 1 as a hinge, in order to bring them to $s'$, thus giving them a constant-progression elongation which has the effect of gradually unwinding the spring.

Hence it will be clear that the spring R merely has to be prevented from unwinding in order to make this effect produce a continuous increase in the adhesion of the turns $s$ on the rod in dependence on the tractive force exerted, and to cause it to be securely locked whatever the said force may be.

FIGURE 3 shows in longitudinal sectional view a device for permitting a rod T to be locked in its axial displacement F′ relatively to a frame 3 through which it extends through a bore 4, using a coil spring.

For this purpose there is arranged on the frame 3 and about the bore 4 a circular bearing part 2 whose external diameter is slightly greater than that of the spring mounted on the rod.

This bearing part comprises on the one hand the segmental abutment 1 extending over the greater part of a quarter of the first turn of the spring R and on the other hand a recess 5 intended to receive one end 6 of the spring, whose other end 7 is held in a corresponding recess 8 formed in a ring 9 traversed freely by the rod T, on which it is nevertheless fixed (FIGURE 4) for example by means of a spigot-end screw 10 sliding in a groove 11 of the rod.

A sheath 12 fast with the ring 9 and serving as a casing for the spring, fits freely over the bearing part 2 of the frame 3 where its flange 13 engaged in the flange 14 of a sleeve 15 fixed to the frame, completes the assembly whilst allowing it free rotational movement.

The device operates in the following manner:

In order to obtain the free sliding movement of the rod T in its bore 4, this rod is given a slight rotational movement in the direction of the arrow F, entraining in this rotational movement the fixed ring 9 and the sleeve 12 which is fast therewith.

It will be seen clearly that since the end 6 of the spring, held fast by the bearing part 2, cannot be displaced whereas the end 7 follows the movement of the ring, the said spring is relaxed by unwinding and its turns cease to act on the rod, which permits free sliding through the bore 4 and the fixed ring 9.

The slight spacing provided between the sleeve 12 and the spring prevents the latter from undergoing any permanent deformation during this operation and all the parts resume their initial position as soon as the rod T is released.

In this position, any tractive force exerted on the rod in the direction of the arrow F′ brings about the process illustrated in FIGURE 2, and since the spring can no longer unwind—since its two ends are held in the recesses 5 and 8—the rod is securely locked, the adhesion of the turns increasing in dependence on the tractive force.

FIGURE 5 shows a square-section locking spring in order to illustrate the advantage of this spring by increasing the adhesion surfaces.

FIGURE 6 shows a variant where the ring 9 which can rotate freely in a sheath 16 fast with the frame is held in place by a flange 17 of this sheath which can be arranged on the frame by any appropriate means, for example by being screwed on to a screwthread 18 of the bearing part, as indicated in the drawings.

The recess which is intended to receive one end of the spring can be formed in the frame itself.

In the forms of embodiment according to FIGURES 3, 4, 5 and 6, in order to obtain the locking of a rod T (FIGURE 7) by means of a spring R, the latter is given a diameter D substantially smaller than the diameter $D_1$ of the rod for which it is intended. The mounting of the rod under these conditions requires the spring R to be forcibly opened by acting on its two ends 101 and 102, in order to obtain, after mounting, an initial adhesion of the turns on the rod which is all the greater and all the more effective in proportion as $D_1-D$ is greater. Then all that has to be done is to imprison these two ends respectively in a recess 103 (FIGURE 8) of a segmental seat 104 through which the rod T extends freely, and a recess 105 formed on a ring 106 fixed to this rod for the rod T to be securely locked relatively to the seat 104 despite any pressure effected in the direction of the arrow F.

According to these forms of embodiment, in order to unlock the rod, it is given a rotational movement in the direction of the arrow $F_1$, which brings about the opening of the spring by unwinding, whilst in order to re-lock the spring it merely has to be released, the spring R acting in the direction of the arrow $F_2$, having to re-establish the initial position and the initial adhesion.

Now, experience has shown that where the device is brought to the state shown in FIGURE 8, if the rod T is given a rotational movement in the direction of the arrow $F_3$ (FIGURE 9) in order to obtain the opening of the spring R, insead of obtaining a uniform extension of the turns, the turns are subjected to a progressive convergent deformation from the ring 106 which is fixed on the rod. As a result, as soon as the rod T is released, the least opened turns $S_1$ being the first to close, prevent the rod from continuing its rotation and re-absorbing the slack of the turns $S_2$ which thus become completely unusable in all cases which require repeated operations. This disadvantage is overcome by adding an essential modification to the mounting of the spring, which is shown diagrammatically by way of example in FIGURE 10, in which the spring $R_1$ has a slightly larger diameter than that of the rod T which may therefore, normally, extend freely through the said spring.

The two ends 107 and 108 of this spring are imprisoned respectively in two rings 109 and 110 having segmental abutments 111 and 112.

The bore of these two rings being of a slightly greater diameter than that of the rod T, the latter can slide freely in the device as long as no torsional effect is exerted on the spring $R_1$.

The ring 109 is fixed by any suitable means, for example by means of a pointed screw 113, in a chamber 114 of a frame 115, whilst the ring 110 is freely fixed to the rod T by means of, for example, a spigot-end screw 116 acting in a longitudinal groove 117 formed on this rod.

Finally, a stop plug 118, fast with the frame 115, holds the device in position and prevents any longitudinal displacement thereof.

Under these circumstances it is reliably ensured that the rod T can slide freely in the device as long as the spring $R_1$ is not subjected to any torsional force. On the contrary, this rod merely has to be given a rotational movement in the direction of the arrow $F_4$ to entrain the fixed ring 110 and also the end 108 of the spring in the same direction, whilst the end 107 cannot follow the rotational movement, being held fast in the fixed ring 109.

As a result, the turns are wound about the rod with an adhesion which is dependent on the force exerted at $F_4$, and this rod is locked in the device both against tractive forces and also against compressive forces.

On the contrary, as soon as the rotational force at $F_4$ has ceased, the spring $R_1$ will resume its normal position without any risk of deformation, and the rod will resume its free sliding movement.

FIGURE 11 shows in longitudinal sectional view the application of the device to two sliding members O and $O_1$ in order to lock and unlock this sliding movement, FIGURE 12 being a diagrammatic end view explaining FIGURE 11.

In the selected example, the part O is considered as being fixed whilst the part $O_1$ can effect an axial displacement relatively to the said fixed part O.

As the drawings show, the device is mounted on the part O and on the axis of displacement, in a manner which is similar in every way to that described hereinbefore and illustrated in FIGURE 10.

The rod T extends freely through this device and also a bore 119 formed in a bearing part 120 of $O_1$ whereas a stop ring 121 and the flange 122 of a handle P mounted on the said rod on either side of the bearing part 120, render the rod fast with the mobile part $O_1$ where it can rotate without being able to move longitudinally.

With this arrangement, it will be clear that any action on the handle P in the direction of the arrows $F_5$ or $F_6$ will cause the free displacement of the part $O_1$ relatively to the part O in the direction of these arrows.

Whereas if the handle P is rotated in the direction of the arrow $F_7$ (FIGURE 12) until the complete winding of the spring $R_1$ on the rod T with a sufficient adhesion of its turns to the said rod, the part $O_1$ will be securely locked relatively to O, both against compressive force and also against tractive force.

Provided on the collar 122 is a cam 123 which is displaceable before a push member 124 whose spring 125 keeps it constantly in contact with the cam.

In the position of free sliding, an abutment 126 and the push member 124 acting on either side of the cam 123 ensure the stability of the position of the handle P.

When this handle is subjected to rotational movement in the direction of the arrow $F_7$, the cam lifts the push member 124 and rocks towards the position $123_1$ where it is immobilised by the action of the same push member, whilst the spring 125, being regulated for this purpose, ensures the necessary adhesion of the turns of the spring $R_1$ on the rod T.

In order to unlock, all that has to be done is to act on the handle in the reverse direction, in which case the abutment 126 serves to limit any inopportune movement which may deform the spring.

In some cases, it is advantageous to maintain a permanent locking state, and to resort to unlocking operations of short duration only, using springs $R_1$ of an initial diameter D greater than that of the rod T.

The variant shown diagrammatically in FIGURES 13 and 14 makes it possible to obtain this result.

For this purpose, the arrangement of the rod in the mobile part $O_1$ has the following feature:

Between the ring 121 and the bearing part 120 of $O_1$ there is interposed a spring $R_2$ (FIGURE 13) of double-action type, tending on the one hand to make the part $O_1$ bear strongly against the collar 122 of the handle P and on the other hand to give the rod T a rotational movement in the direction of the arrow $F_8$, the tension of this spring and of this rotational movement being regulated so as to maintain the spring $R_2$ constantly wound about the rod with a sufficient adhesion to ensure locking.

In order to unlock, the handle is given a slight rotational movement in the direction of the arrow $F_9$ (FIG- URE 14) which brings $R_2$ back to its initial diameter, permitting the free sliding of the rod T, whereas as soon as the handle is relinquished, the spring $R_2$ automatically re-establishes the locking state.

In order to preserve the spring $R_2$ against any deformation by inopportune operations of the handle P, the rotational movement of the said handle is limited by a pointed screw 127 suitably placed, whose point emerges into a bore 119 opposite a flat 128 formed on the rod T.

The diagrammatic sectional view taken on X—X of FIGURE 13 which is shown in FIGURE 14 shows that if the position P of the handle and the corresponding position Y—Y of the flat are determined as a result of the winding of the spring $R_2$ on the rod, when acting on the handle in the direction of the arrow $F_9$ in order to obtain unlocking, it is scarcely possible to go beyond a safety position $P_1$ wherein the flat 128 having been displaced to Z—Z, said flat will come to abut against the point of the screw 127.

I claim:

1. A device for effecting the longitudinal locking of cylindrical rods and shafts by means of coil springs coaxially surrounding the rods and shafts, characterized by a seat for the spring constituted by a segmental abutment having a surface substantially perpendicular to a shaft being locked and having an area such that curvature of the spring about said abutment will not cause permanent deformation of the spring, said surface acting on only a part of the annulus formed by the first turn of the spring and leaving free the greater part of the said turn, in order to force these turns to rock, under the action of any tractive force to which the rod is subjected, about the abutment and thus to permit increasing their adhesion in dependence on the tractive force, and also characterised by elements permitting the rod to be given a rotational movement in the direction of the pitch of the spring, in order to wind the spring on to the rod with a given adhesion of the turns in order in this way to effect longitudinal locking.

2. A device according to claim 1, characterised by a handle, used for the operation of the rod, having a flange comprising a cam displaceable before a spring-loaded push member adapted to stop it in its different positions and to exert, in the locking position, a sufficient pressure to maintain adhesion.

3. A device according to claim 1, characterised by appropriate means acting on the rod in a permanent manner in the sense of winding the spring in order to effect this adhesion, unlocking being obtained by means temporarily eliminating this rotational effect.

4. A device according to claim 1, characterised by a pointed screw situated opposite a flat portion formed on the rod in order to limit its rotational movement so as to prevent the deformation of the spring, the point of this screw, entering the bore accommodating the rod and penetrating into the cavity formed by the said flat, serving as an abutment therefor in both directions of rotation.

5. Device for locking a rod axially displaceable with respect to the device, comprising a coil spring coaxially surrounding the rod; a segmental abutment adjacent the rod and having a surface perpendicular to the axis of the rod, the area of said surface being such that curvature of the spring about said abutment will not cause permanent deformation of the spring, said surface being engageable by a length of an end turn of said spring in the displacement direction of the rod, the remaining length of said end turn and the corresponding lengths of succeeding turns of said spring being free and at least partly frictionally engageable by the rod so that said turns tend to pivot about said abutment in said displacement direction and tend to elongate and unwind; and means cooperating with said segmental abutment for tightening said coil turns on the rod so as to resist pivoting of said turns about said abutment and elongation and unwinding of said turns.

6. Device according to claim 5, wherein said segmental abutment is comprised of a bearing member provided on a frame and having a bore through which the rod is axially displaceable, said segmental abutment being formed with a recess in which one end of said spring is received.

7. A device according to claim 5, characterised in that the segmental abutment extends over the greater part of a quarter of the first turn.

References Cited by the Examiner

UNITED STATES PATENTS

| 1,935,683 | 11/1933 | Wemp | 192—81 |
| 2,429,383 | 10/1947 | Arens | 74—531 X |
| 2,438,672 | 3/1948 | Margrave | 74—527 |
| 2,750,994 | 6/1956 | Howell | 188—67 |
| 3,099,023 | 7/1963 | Buchholz et al. | 188—67 |

MILTON BUCHLER, *Primary Examiner.*

EUGENE G. BOTZ, ARTHUR L. LA POINT,
*Examiners.*

G. E. A. HALVOSA, *Assistant Examiner.*